United States Patent [19]
Vega

[11] 3,948,797
[45] Apr. 6, 1976

[54] PROCESS FOR RESTORATION OF PERFORMANCE OF A CHEMICAL LIGHT SYSTEM

[75] Inventor: Mary-Louise Vega, Califon, N.J.

[73] Assignee: American Cyanamid Company, Stamford, Conn.

[22] Filed: Nov. 29, 1973

[21] Appl. No.: 420,116

[52] U.S. Cl. 252/188.3 CL; 252/301.2 R; 252/455 Z
[51] Int. Cl.² ............... C09K 11/00; C09K 11/06
[58] Field of Search 252/188.3 CL, 455 Z, 301.2 R, 252/301.3 R, 186; 260/485 S, 485 R

[56] References Cited
UNITED STATES PATENTS

| | | | |
|---|---|---|---|
| 3,311,564 | 3/1967 | Cline | 252/188.3 |
| 3,325,417 | 6/1967 | Rauhut | 252/188.3 |
| 3,597,362 | 8/1971 | Bollyky | 252/186 |
| 3,691,085 | 9/1972 | Roberts | 252/188.3 |
| 3,749,679 | 7/1973 | Rauhut | 252/188.3 |

Primary Examiner—Samuel W. Engle
Assistant Examiner—Ralph Palo
Attorney, Agent, or Firm—Charles J. Fickey; Gordon L. Hart

[57] ABSTRACT

A process for the restoration of the initial chemical lighting potential of a chemiluminescent lighting system. More particularly, a process for the restoration of the chemical lighting potential of a two component chemiluminescent lighting system.

4 Claims, No Drawings

PROCESS FOR RESTORATION OF PERFORMANCE OF A CHEMICAL LIGHT SYSTEM

FIELD OF THE INVENTION

This invention relates to a process for the restoration of the chemical lighting potential of a chemiluminescent system. More particularly, it relates to the restoration of the initial light emission of a two component liquid phase oxalate ester chemical light system.

DESCRIPTION OF THE PRIOR ART

The procedure of practical quantities of light directly from chemical energy with high efficiency has only recently been accomplished. One of the factors which has made this achievement difficult is the fact that emission lifetimes can be markedly accelerated or slowed by the presence of extremely low concentrations of bases or acids, respectively; in some cases, the presence of extremely low concentrations of impurities can completely inhibit the production of light.

The general disclosure of U.S. Pat. No. 3,597,362, which is hereby incorporated by reference, discloses a composition for generating light by reacting an oxalic ester with a hydroperoxide in the presence of a solvent and a fluorescent compound.

Copending commonly assigned U.S. Pat. applications Ser. No. 842,134 filed July 16, 1969, now abandoned and Ser. No. 813,862 filed Apr. 7, 1969, now abandoned, also disclose compositions for generating light by a similar reaction.

The two-component, liquid phase oxalate ester chemical light system must comprise an "oxalate component" comprising an oxalic acid diester and a solvent, and a "peroxide component" comprising hydrogen peroxide and a solvent or mixture of solvents. In addition, an efficient fluorescer must be contained in one of the components and an efficient catalyst, necessary for intensity and lifetime control, must be contained in one of the components. The oxalate component must provide an oxalate ester-solvent combination which permits suitable ester solubility and which permits storage stability. The peroxide component must provide a hydrogen peroxide-solvent combination which permits suitable hydrogen peroxide solubility and permits storage stability. The solvents for the two components may be different but should be miscible. At least one solvent must solubilize the efficient fluorescer and at least one solvent must solubilize the efficient catalyst. The fluorescer and at least one solvent must solubilize the efficient catalyst. The fluorescer and catalyst must be placed as to permit both solubility and storage stability in the final components.

The oxalate component is selected from the group comprising at least 0.01M (preferably at least 0.03M) of a bis-(2,4,5-trichloro-6-carboalkoxyphenyl)oxalate and at least 0.0001M (preferably at least 0.001M) of a fluorescer selected from the group comprising 9,10-bis(phenylethynyl) anthracene, monochloro and dichloro substituted 9,10-bis(phenylethynyl) anthracenes, 5,12-bis(phenylethynyl)tetracene, 9,10-diphenyl anthracene, perylene and 16,17-dihexyloxyviolanthrone and an aromatic solvent such as benzene, chlorobenzene, ethylbenzene, dimethyl phthalate, dibutyl phthalate, o-dichlorobenzene, ethylbenzoate, butyl benzoate and 1,3-butyleneglycol dibenzoate; and wherein the peroxide component is selected from the group comprising (1) at least 0.01M hydrogen peroxide (preferably at least 0.10M hydrogen peroxide) in a tertiary alcohol such as t-butyl alcohol, 3-methyl-3-pentanol, 3,6-dimethyloctanol-3 or an ester such as dimethyl phthalate, or combinations of both, and a catalyst in the concentration range $1\times10^{-4}M$ to $1\times10^{-1}M$ (preferably $1\times10^{-3}M$) comprising the anion of a carboxylic acid or phenol having an aqueous dissociation constant between about $1\times10^{-6}$ and $1\times10^{-1}$ (preferably between about $5\times15^{-4}$ and about $5\times10^{-2}$) (examples are sodium salicylate, tetrabutyl ammonium salicylate, tetrabutylammonium 2,3,5-trichlorobenzoate, potassium pentachlorophenolate and tetraethyl ammonium benzoate).

It is particularly important that admixture of the oxalate component and activator component immediately produces the highest level of light intensity rather than producing the highest intensity after 10 minutes have elapsed.

Occasionally, for reasons that are not fully understood, the two component composition fails to produce good initial light intensity and the brightness-lifetime performance of the system is unsatisfactory. Investigation of this phenomena has resulted in a finding that the cause resides in the oxalate component. Several attempts to rejuvenate the oxalate component by treating it with silica gel or macromolecular resins were unsuccessful.

It is therefore an object of the present invention to provide a method for restoring full activity to an oxalate component of chemiluminescent system.

This and other objects of the invention will become apparent as the description thereof proceeds.

DESCRIPTION OF THE INVENTION

I have discovered a simple, economical process for restoring good brightness-lifetime performance to solutions of oxalate esters as described in U.S. Pat. No. 3,597,362 and in U.S. Pat. applications Ser. Nos. 813,862, now abandoned; 813,973, now abandoned; 842,134, now abandoned; 124,142, now U.S. Pat. No. 3,749,679; and 261,888.

This process involves the treatment of an oxalate component containing the fluorescing agent, which fails to produce good initial light intensity after admixing with hydrogen peroxide and the catalyst, with an alkali-metal alumino-silicate at room temperature. Subsequent separation of the alkali-metal alumino-silicate at room temperature. Subsequent separation of the alkali-metal alumino-silicate gives an oxalic component which produces excellent initial light intensity on mixing with hydrogen peroxide and catalyst.

I have found that by simply stirring, at room temperature, an oxalate component which has unacceptable brightness lifetime performance with from 1 to 5% by weight of Linde 5A molecular sieves on the weight of the oxalate component restores the ability of the oxalate component to produce good initial light intensity. The rejuvenated oxalate component continued to give excellent initial brightness after storage at room temperature for two months.

EXAMPLES I to III

Three 500 g. aliquots of an unsatisfactory oxalate component containing bis(2,4,5-trichloro-6-carbopentoxyphenyl) oxalate (0.133M) and 9,10-bis(phenylethynyl)anthracene (0.003M) in dibutyl phthalate were slurried at 25°C. for 3 hours with 5.0, 10.0, and 25.0 g., respectively, (which is 1%, 2% and 5% based on the oxalate weight), of Linde Molecular Sieve-Type 5A (molecular Sieve Type 5A, the calcium form of the Type A crystal structure, is an alkali metal alumino-silicate manufactured by Union Carbide Corporation) and the oxalate component was decanted therefrom after allowing the slurry to stand overnight. The treated and untreated oxalate components were evaluated by mixing 7.5 cc of oxalate component with 2.5 cc of an activator component comprising hydrogen peroxide (1.5M), and sodium salicylate (6.25 × $10^{-4}$M) in 80% dimethyl phthalate —20 % tertiary butanol, by volume, in a polyethylene lightstick, shaking well, and measuring, by means of a broadband photometer, the intensity of the emitted light versus time. These intensities are reported as luminosity values (lumens per liter) in Tables I through III, representing Examples I to III, for the untreated sample and the treated sample, initially and after storage for 60 days at 25°C. The results clearly demonstrate the increase in initial luminosity effected by this treatment.

EXAMPLE I

TABLE 1

Oxalate Component Rejuvenated with 1% (by weight) Linde Molecular Sieve — Type 5A

| Comment | LUMINOSITY ($lm.l.^{-1}$) vs. Time | | | | | |
|---|---|---|---|---|---|---|
| | 0 Min. | 10 Min. | 30 Min. | 60 Min. | 90 Min. | 120 Min. |
| Before Treatment | 000 | 236 | 174 | 93 | 51 | 32 |
| After Treatment | 1185 | 259 | 169 | 87 | 51 | 32 |
| After Treatment | 1296 | 264 | 170 | 88 | 52 | 32 |
| After 60 Days Storage at 25°C. | 1488 | 219 | 193 | 100 | 49 | 26 |

EXAMPLE II

TABLE II

Oxalate Component Rejuvenated with 2% (by weight) Linde Molecular Sieve —Type 5A

| Comment | LUMINOSITY ($lm.l.^{-1}$) vs. Time | | | | | |
|---|---|---|---|---|---|---|
| | 0 Min. | 10 Min. | 30 Min. | 60 Min. | 90 Min. | 120 Min. |
| Before Treatment | 000 | 236 | 174 | 93 | 51 | 32 |
| After Treatment | 1397 | 248 | 182 | 94 | 49 | 28 |
| After 60 days Storage at 25°C. | 1488 | 219 | 193 | 100 | 49 | 26 |

EXAMPLE III

TABLE III

Oxalate Component Rejuvenated with 5% (by weight) of Linde Molecular Sieve —Type 5A

| Comment | LUMINOSITY ($lm.l.^{-1}$) vs. Time | | | | | |
|---|---|---|---|---|---|---|
| | 0 Min. | 10 Min. | 30 Min. | 60 Min. | 90 Min. | 120 Min. |
| Before Treatment | 000 | 236 | 174 | 93 | 51 | 32 |
| After Treatment | 1616 | 199 | 162 | 98 | 57 | 35 |
| After 60 Days Storage at 25°C. | 1871 | 200 | 152 | 93 | 53 | 33 |

I claim:
1. A process for the rejuvenation of an oxalate component of a chemical lighting system, said oxalate component comprising an oxalic acid diester and a fluorescer in organic liquid solvent, which process comprises mixing the oxalate component with a molecular sieve and then separating the treated component therefrom.
2. The process of claim 1 wherein the molecular sieve is Type 5A molecular sieve.
3. The process of claim 2 wherein the amount of molecular sieve used ranges from less than about 10%, on the weight of the oxalate component.
4. The process of claim 2 wherein the amount of molecular sieve is from about 1 to 5%, on the weight of the oxalate component.

* * * * *

Dedication 3,948,797.—*Mary-Louise Vega*, Califon, N.J. PROCESS FOR RESTORATION OF PERFORMANCE OF A CHEMICAL LIGHT SYSTEM. Patent dated Apr. 6, 1976. Dedication filed Dec. 21, 1989, by the assignee, American Cyanamid Company.

Hereby dedicates to the Public all claims of said patent.
*[Official Gazette April 10, 1990]*